(12) United States Patent
Sheng

(10) Patent No.: US 7,224,346 B2
(45) Date of Patent: May 29, 2007

(54) NON-NATIVE LANGUAGE WRITING AID METHOD AND TOOL

(75) Inventor: Ye Sheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 10/166,501

(22) Filed: Jun. 10, 2002

(65) Prior Publication Data

US 2003/0011642 A1   Jan. 16, 2003

(30) Foreign Application Priority Data

Jun. 11, 2001 (CN) .............................. 01 1 21472

(51) Int. Cl.
*G09G 5/00* (2006.01)
*G06F 17/20* (2006.01)

(52) U.S. Cl. .......................... 345/171; 345/169; 704/1; 704/10

(58) Field of Classification Search ................ 345/156, 345/169, 171, 700, 705–711, 172; 707/1–8; 715/530–536; 704/1–10; 382/309–311
See application file for complete search history.

(56) References Cited

U.S. PATENT DOCUMENTS

| 5,959,629 A | * | 9/1999 | Masui ........................ 715/808 |
| 6,044,365 A | * | 3/2000 | Cannon et al. ................ 707/2 |
| 6,091,415 A | * | 7/2000 | Chang et al. ................ 715/809 |
| 6,490,576 B1 | * | 12/2002 | Nishiguchi ..................... 707/3 |
| 6,735,559 B1 | * | 5/2004 | Takazawa ...................... 704/7 |

* cited by examiner

*Primary Examiner*—Richard Hjerpe
*Assistant Examiner*—Duc Q Dinh
(74) *Attorney, Agent, or Firm*—Ido Tuchman; Anne Dougherty

(57) ABSTRACT

A non-native language writing aid method and a tool for implementing the same intercept and captures the user's input, and display possible words and their interpretation in real time adjacent a cursor input. The tool can automatically adjust and select more possible words and their interpretation, while the user sequentially inputs characters constituting the input, until he/she chooses one word or makes a confirmation on his/her input. The invention may implement spelling check and meaning verification in real time, and provide expression prompting and a fuzzy search function, so that non-native language input speed can be greatly improved. The present invention is not limited to specific applications and can be incorporated into existing applications.

12 Claims, 2 Drawing Sheets

NON-NATIVE LANGUAGE WRITING AID METHOD AND TOOL

BACKGROUND OF THE INVENTION

1. Field of the Invention

The invention relates to word processing, and more specifically, to spelling check and meaning verification in word processing.

2. Brief Description of the Prior Art

When writing a document with a computer, people often use word processing programs. During the writing of a document in a non-native language, people usually use the spelling check function in the word processing programs. If English is our native language, we need only the spelling check function; however, if English is not our native language, we need not only the spelling check function, but also the meaning verification function, while writing a document. The following cases may happen when we write documents:

1. The meaning of the word to be written needs to be confirmed.
2. Only fuzzy spelling or a part of the word to be written can be remembered.
3. Several words can be used to express one meaning, but we are not sure which one is the most appropriate.
4. Don't even know how to express an idea in English.
5. Don't know exactly the usage of a certain phrase.

Let's suppose the native language is Chinese. As to case 1, the problem can be solved by looking up in English-Chinese dictionaries. As to case 4, the problem can be solved by looking up in Chinese-English dictionaries. But as to case 2, no common dictionary can be referred to in order to solve the problem. Therefore an intelligent matching scheme is needed to list all the candidate words.

SUMMARY OF THE INVENTION

The invention provides a non-native language writing aid method, and a non-native language writing aid tool for implementing the method, to solve the above problems.

According to one aspect of the invention, a non-native language writing aid method comprises the steps of: intercepting and capturing the user's input; following the cursor input and displaying possible words and their interpretation in real time; automatically adjusting and selecting more possible words and their interpretation, while the user sequentially inputs characters constituting the input, until he/she chooses one word or makes a confirmation on his/her input.

According to another aspect of the invention, a non-native language writing aid tool comprises: intercepting means for intercepting and capturing the user's input; and real-time spelling checking and meaning verifying means for following the cursor input, displaying possible words and their interpretation in real time, and automatically adjusting and selecting more possible words and their interpretation, while the user sequentially inputs characters constituting the input, until he/she chooses one word or makes a confirmation on his/her input.

The non-native language writing aid tool according to the invention can have the following functions:

1. Spelling check in real time;
2. Meaning verification in real time;
3. Intelligent fuzzy matching and presentation of a list of the possible words;
4. Two way translation and interpretation; and
5. Associative usage hint on word or phrase.

The above new functions are not limited to specific applications, and the tool according to the invention can be added onto any word processing application. Users need not abandon their favorite word processing application in order to use the present tool. The object and the advantage of the invention will be more apparent in the following description of the preferred embodiments with reference to the drawings.

DETAILED DESCRIPTION OF THE INVENTION

Figure 1:
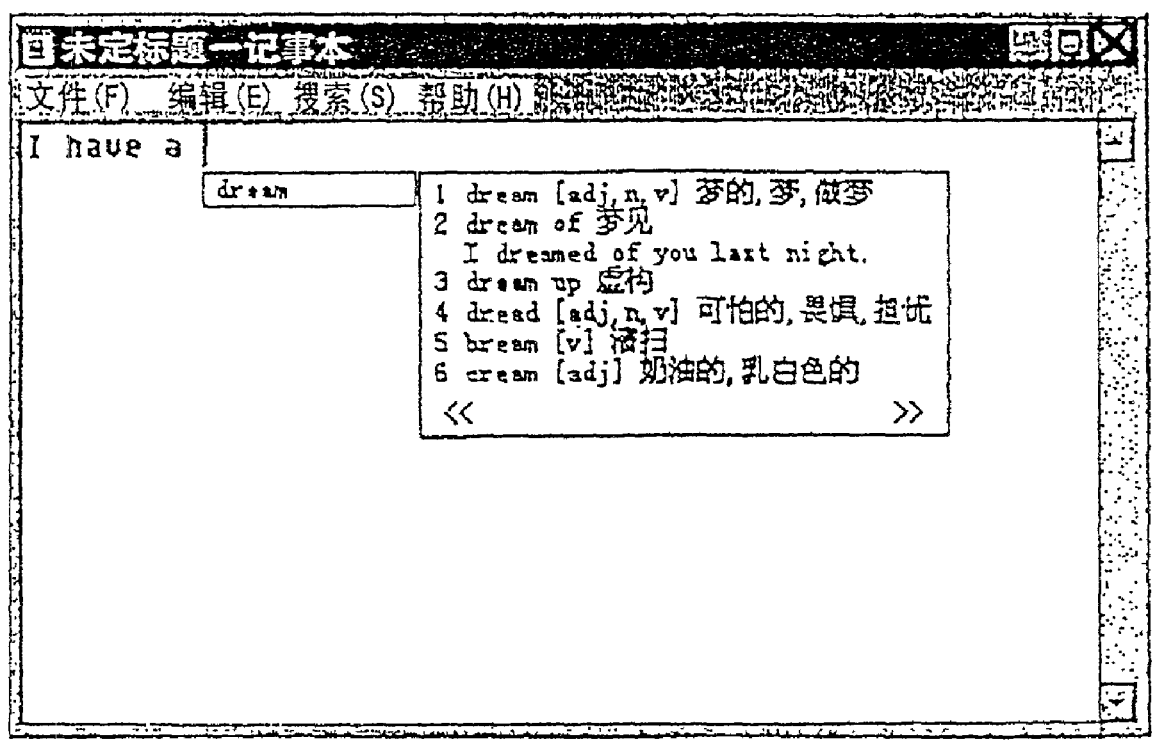
FIG. 1 shows the effects of an example using the non-native language writing aid tool in a preferred embodiment according to the invention.

As shown in FIG. 1, the non-native language writing aid tool in a preferred embodiment according to the invention, when running, intercepts and captures the user's input, and displays possible words and their interpretation in real time following (or otherwise adjacent) the cursor input. The tool automatically adjusts and selects more possible words and their interpretation, while the user sequentially inputs characters constituting the input, until he/she chooses one word or makes a confirmation on his/her input. The display priority of words, phrases or usage hints can be determined, based on the user's configuration. When writing a document, different users may have different requirements. For example, users having good spelling ability may require a prompt of the phrase and a usage hint thereof, while users having bad spelling ability may need the function of fuzzy word matching to be provided. Corresponding to the above different requirements, the tool according to the invention may preset which word, phrase, or usage hint is to be displayed first, according to the user's configuration. In FIG. 1, reference numeral 1 refers to optimally matching, reference numeral 2 refers to phrase prompting and sentence exemplifying, and reference numerals 4,5 and 6 refer to selecting words through fuzzy matching. The phrase prompting, sentence exemplifying and fuzzy matching functions may be enabled or disabled as required.

Figure 2:
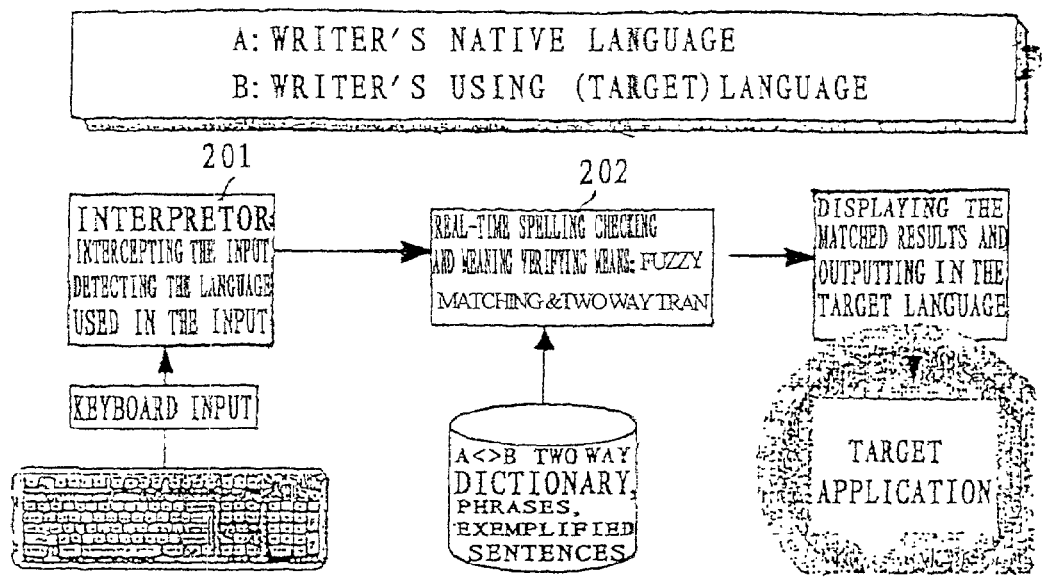
FIG. 2 is a systematical block diagram showing the non-native language writing aid tool in a preferred embodiment according to the invention.

FIG. 2 is a system block diagram showing the non-native language writing aid tool in a preferred embodiment according to the invention.

Let's suppose the native language of the user is A, and he plans to write in language B. The interceptor 201 according to the invention intercepts and captures the user's input, for example, at the system level. The user's input may be either in Language A or in Language B. The real-time spelling checking and meaning verifying means 202 firstly detects, in real time, the language used for inputting words, and then decides the matching strategy according to the user's configuration. The user's configuration may be adjusted so as to control whether or not the function of fuzzy matching is allowed, whether or not the exemplified sentence is displayed, and so on. If the real-time spelling checking and meaning verifying means 202 detects the language used for inputting words is B, it will search for match based on the input string and list out all the possible words. And simultaneously it will present the translation in Language A to the user for verifying the input. In addition, the real-time spelling checking and meaning verifying means 202 may present the exemplified sentence to prompt the user how to use the word or the phase, according to the user's configuration. The order of the results may be adjusted automatically. For example, the order in which the results are displayed may be adjusted according to the historic use records. The user may select one word from the words listed, or input a string to make a further match, until he/she finds the word or the phrase he/she wanted. Lastly, the resulting word or phrase in Language B is transferred to the target application. If the user's input is in Language A, the real-time spelling checking and meaning verifying means 202 will first translate the input into Language B, and list the resulting word or the phrase in Language B and the detailed interpretation in Language A. Then the user may choose to directly transfer the word or the phrase in Language B to the object application.

Figure 3:
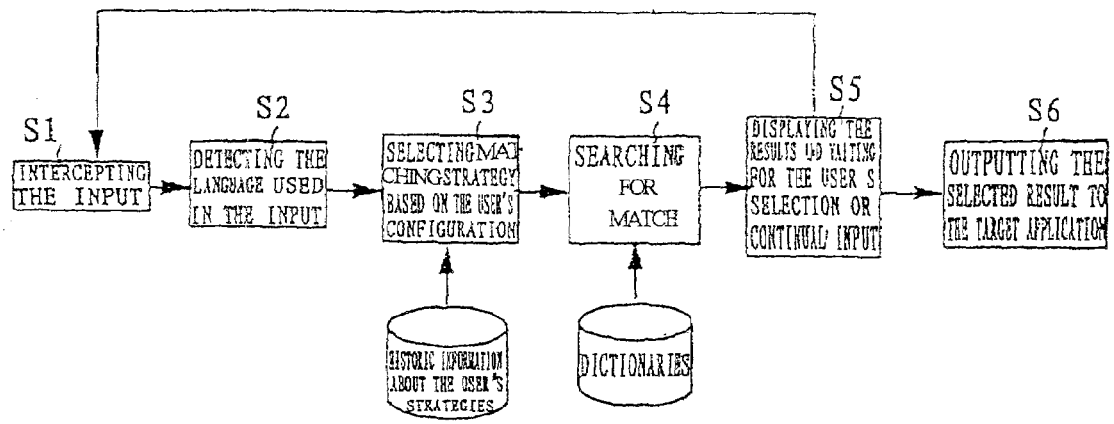
FIG. 3 is a flow chart showing the non-native language writing aid method in a preferred embodiment according to the invention.

FIG. 3 shows the flow chart of the non-native language writing aid method in a preferred embodiment according to the invention.

As shown in FIG. 3, the steps include: intercepting the user's input (S1); detecting the language used for input words (S2); selecting the matching strategy based on the user's configuration (S3); searching for a match (S4); displaying the results for the user's selection or further input (S5), and outputting the result to the target program (S6).

The dictionaries used in the non-native language writing aid method and the non-native language writing aid tool may be selected according to the user's requirements. The dictionaries may establish many mappings, for example, the Chinese interpretation for the writing in English, the Chinese interpretation for the writing in French, the English interpretation for the writing in French, and the Chinese interpretation for the writing in Chinese. The non-native language writing aid method and the non-native language writing aid tool may be used to help train students in writing.

The present invention can provide real-time spelling check and meaning verification, as well as expression prompting and a fuzzy searching function for writing, so that non-native language input speed can be greatly improved. The present invention is not limited to specific applications and may well be incorporated into existing applications. Given a language and its interpretation, the present invention is applicable to the teaching of writing, for example, to help the pupils to better understand the usage of words and sentences in writing exercises.

The present invention can be implemented in software, hardware, or a combination thereof; one preferred implementation is via a suitably programmed general purpose digital computer. Accordingly, the present invention contemplates a program storage device, readable by a machine, tangibly embodying a program of instructions executable by the machine to perform any, some, or all of the method steps set forth herein. The instructions on the program storage device can optionally be such as to add the functionality of the present invention to existing word processors or other application programs.

The invention has been described with reference to the embodiments and the drawings which are intended to better illustrate the principles of the invention rather than to limit the invention. It will be apparent that the invention can be modified by those skilled in the art, without departing from the spirit and scope of the invention.

What is claimed is:

1. A method, suitable for use in a word processing application, for aiding a user to write a document in a non-native language, the method comprising:

receiving an input string;

automatically determining a language used for the input string;

if the input string is in the non-native language, the method further comprising:

presenting a string list of one or more possible strings in the non-native language corresponding to the input string;

presenting a translation of the possible strings in a native language proximate the possible strings; and setting a match strategy which determines display priority of at least one of the possible strings based on a configuration of the user.

2. The method of claim 1, wherein if the input string is in the non-native language, the method further comprising presenting string usage instruction proximate the possible strings.

3. The method of claim 2, wherein the string usage instruction includes an exemplary sentence demonstrating candidate string usage.

4. The method of claim 2, wherein the string usage instruction includes indicating whether the possible string is a noun, verb, adjective or adverb.

5. The method of claim 1, wherein if the input string is in the non-native language, the method further comprising automatically adjusting and selecting additional possible strings and interpretations of the additional possible strings, while the user sequentially inputs characters constituting the input string, until the user selects one of the possible strings from the string list.

6. The method of claim 1, wherein the string list is presented proximate a word processing cursor.

7. The method of claim 1, further comprising checking the input string for spelling errors.

8. The method of claim 1, wherein the method is performed in real time.

9. The method of claim 1, wherein determining the language used for the input string includes detecting in real-time the language used for inputting words.

10. The method of claim 1, further comprising automatically adjusting and selecting additional possible strings and interpretations of said additional possible strings while the user sequentially inputs characters constituting the input until the user chooses one of the possible strings.

11. The method of claim 1, wherein presenting the translation of the possible strings in the native language proximate the possible strings includes displaying possible words corresponding to the input while the user sequentially inputs characters constituting the input string adjacent a cursor.

12. The method of claim 11, wherein presenting the string list of one or more possible strings in the non-native language corresponding to the input string includes displaying interpretation of said words while the user sequentially inputs characters constituting the input string adjacent the cursor.

* * * * *